United States Patent [19]
Smith

[11] Patent Number: 6,072,996
[45] Date of Patent: Jun. 6, 2000

[54] DUAL BAND RADIO RECEIVER

[75] Inventor: James P. Smith, Phoenix, Ariz.

[73] Assignee: Intel Corporation, Santa Clara, Calif.

[21] Appl. No.: 08/828,370

[22] Filed: Mar. 28, 1997

[51] Int. Cl.[7] .................................................. H04B 1/16
[52] U.S. Cl. ...................... 455/189.1; 455/76; 455/258; 455/318
[58] Field of Search ..................... 455/74, 76, 85–87, 455/255, 258, 180.1, 188.1, 189.1, 190.1, 313, 318, 323, 553

[56] References Cited

U.S. PATENT DOCUMENTS

| | | |
|---|---|---|
| 5,200,826 | 4/1993 | Seong . |
| 5,291,516 | 3/1994 | Dixon et al. ................................ 375/1 |
| 5,309,479 | 5/1994 | Cheah ....................................... 375/62 |
| 5,311,149 | 5/1994 | Wagner et al. ...................... 455/314 X |
| 5,386,438 | 1/1995 | England . |
| 5,392,460 | 2/1995 | Mattila et al. . |
| 5,406,615 | 4/1995 | Miller et al. . |
| 5,437,051 | 7/1995 | Oto ................................... 455/189.1 X |
| 5,444,865 | 8/1995 | Heck et al. . |
| 5,446,422 | 8/1995 | Mattila et al. . |
| 5,475,391 | 12/1995 | Spencer . |
| 5,475,677 | 12/1995 | Arnold et al. . |
| 5,493,210 | 2/1996 | Orndorff et al. . |
| 5,493,716 | 2/1996 | Bane . |
| 5,528,633 | 6/1996 | Halik et al. . |
| 5,564,076 | 10/1996 | Auvray ....................................... 455/76 |
| 5,668,836 | 9/1997 | Smith et al. ............................. 375/316 |
| 5,694,414 | 12/1997 | Smith et al. ............................. 375/200 |

*Primary Examiner*—William G. Trost
*Attorney, Agent, or Firm*—Blakely, Sokoloff, Taylor & Zafman LLP

[57] ABSTRACT

A dual band radio receiver is provided. The dual band radio receiver includes a local oscillator configured to generate a local oscillator (LO) signal. The dual band radio receiver also includes first and second mixer devices. The first mixer device is configured to receive the LO signal and an RF signal included within a first band. Responsive to these signals, the first mixer device outputs a first IF signal. The second mixer device is configured to receive the LO signal and a second RF signal included within a second band. In response to these signals the second mixer device outputs a second IF signal. The local oscillator is configured to operate within a third band located between the first and second bands.

19 Claims, 6 Drawing Sheets

DUAL BAND RADIO RECEIVER

BACKGROUND OF THE INVENTION

1. Field of the Invention

The present invention relates to the field of communication devices. More particularly, the present invention relates to radio receivers.

2. Description of Related Art

Radio receivers are well known in the art. Typically, a radio receiver intercepts radio frequency (RF) signals by way of an antenna that is coupled to a front end of the radio receiver. The front end of a radio receiver typically includes one or more filters and low-noise amplifiers that receive incoming RF signals. Since signal processing is less complicated for signals at lower frequencies, RF signals are typically down-converted by a mixer before being processed.

Typically, a mixer receives the RF signal to be down-converted and a signal from a local oscillator device (LO) that may have a frequency lower than the frequency of the RF signal. In response to these signals, the mixer produces an intermediate frequency (IF) signal that may further be driven to an IF filter from where a filtered IF signal may be driven to a demodulator, signal processing unit, etc. The IF signal has an amplitude proportional to the amplitude of the RF signal and a frequency typically lower than the frequency of the RF signal. In most radio receivers, the frequency of the IF signal is proportional to the difference between the frequency of the RF signal and the frequency of the local oscillator device.

A dual band radio receiver is a receiver configured to receive signals belonging to two frequencies ranges (bands). For example, in certain multimedia applications, signals belonging to two bands such as data and voice signals may be transmitted intermittently to a dual band radio receiver. The dual band radio receivers that are typically utilized in these applications require two local oscillators, one for each band. Additionally, such dual band radio receivers may require two IF processing devices such as demodulators, amplifiers, signal processors, etc. These dual band radio receivers are expensive due to the utilization of two local oscillators and two IF demodulation stages.

It is desirable to provide a dual band radio receiver at reduced cost. It is also desirable to provide a dual band radio receiver that allows quick switching of a local oscillator device between two high frequency bands that are relatively close to each other.

SUMMARY OF THE INVENTION

The present invention provides a dual band radio receiver. The dual band radio receiver includes a local oscillator configured to generate a local oscillator (LO) signal. The dual band radio receiver also includes first and a second mixer devices. The first mixer device is configured to receive the LO signal and an RF signal included within a first band. Responsive to these signals, the first mixer device outputs a first IF signal. The second mixer device is configured to receive the LO signal and a second RF signal included within a second band. In response to these signals the second mixer device outputs a second IF signal. The local oscillator is configured to operate within a third band located between the first and second bands.

BRIEF DESCRIPTION OF THE DRAWINGS

The features, aspects, and advantages of the present invention will become more fully apparent from the following Detailed Description, appended claims, and accompanying drawings in which:

DETAILED DESCRIPTION OF THE INVENTION

In the following description, numerous specific details are set forth to provide a thorough understanding of the present invention. However, one having ordinary skill in the art should recognize that the invention can be practiced without these specific details. In some instances, well-known circuits, structures, and techniques have not been shown in detail to avoid unnecessarily obscuring the present invention.

Figure 1:
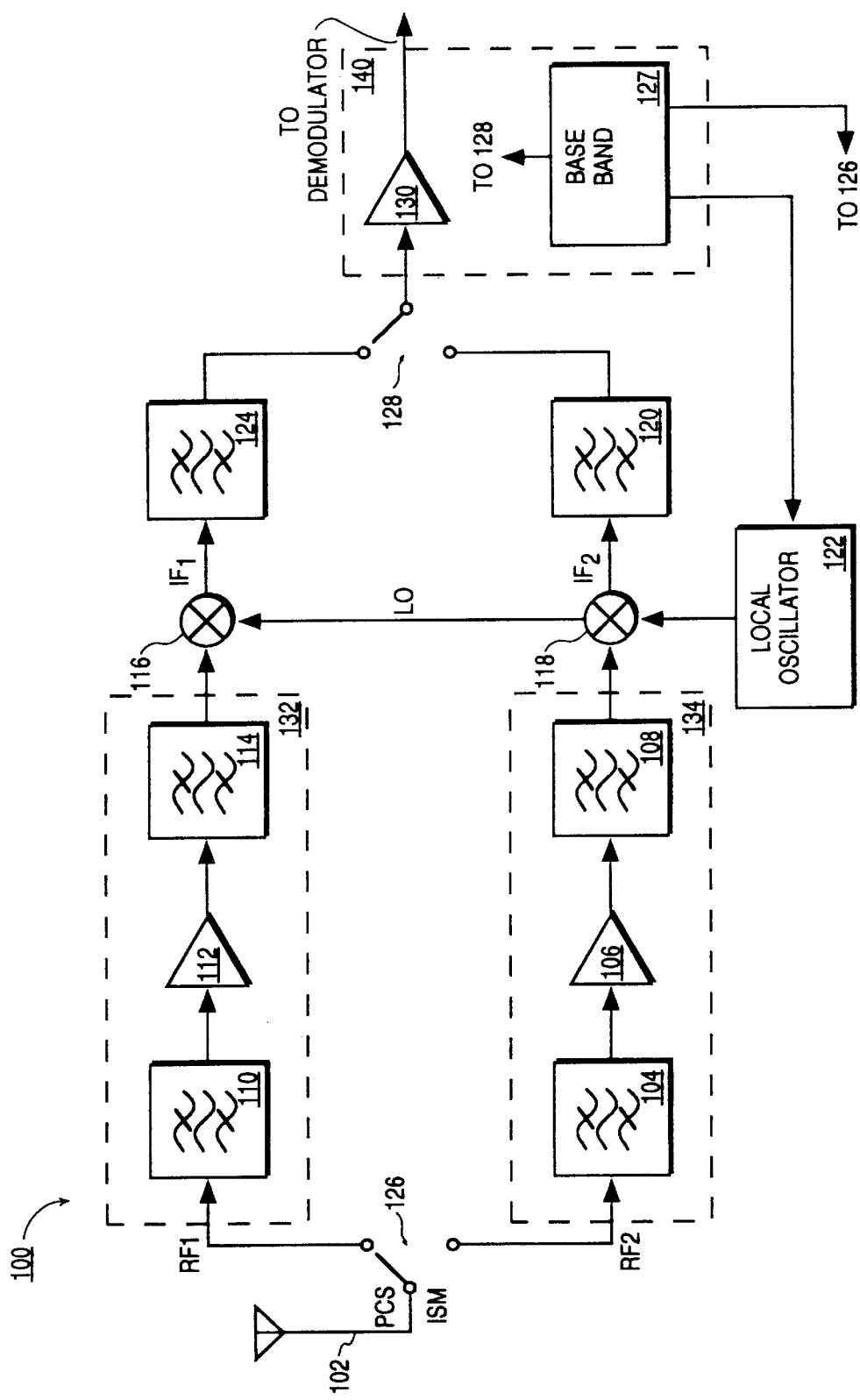
FIG. 1 illustrates a block diagram showing a dual band communication device according to the present application.

FIG. 1 illustrates a block diagram of a dual band communication device 100 according to the present invention. In the embodiment according to the present invention described herein, the dual band communication device 100 is implemented as a radio receiver but the present invention is not limited in scope to a radio receiver. Dual band radio receiver 100 includes an antenna 102 that typically receives RF signals at a high frequency. In the embodiment described herein, dual band radio receiver 100 receives signals transmitted within PCS and the ISM frequency ranges. Signals within the PCS frequency range may be used for voice communication (telephony) and include signals with frequencies in the range of approximately 1.910–1.930 Gigahertz (GHz) (hereinafter "first band"). Signals within the ISM frequency range may be used for video communication and include signals with frequencies in the range of approximately 2.40–2.4835 GHz (hereinafter "second band"). Dual band radio receiver 100 according to the present invention, however, is not limited to the reception of signals within these two frequency bands.

Dual band radio receiver 100 further includes a switching device 126 coupled to antenna 102 and configured to be coupled to one of a first and second front end receivers 132 and 134 respectively shown in dotted line. Switching device 126 is controlled by a base band controller 127 and is configured to selectively couple a RF signal intercepted by antenna 102 to one of the first front end receiver 132 and second front end receiver 134 depending on whether the RF signals frequency is within the first or the second band.

Front end receivers 132 and 134 may be conventional front end receivers known in the art. First front end receiver 132 includes a first band-pass filter 110, a low-noise amplifier 112 and a second band-pass filter 114 but the present invention is not limited in scope to these devices. The first band-pass filter 110 rejects frequencies outside 1.910–1.930

GHz. Low-noise amplifier 112 provides reverse isolation that reduces radiation back to the antenna 102 and boosts the gain. Second band-pass filter 114 also rejects frequencies outside 1.910–1.930 GHz. Second front end receiver 134 includes band-pass filters 104 and 108 and low-noise amplifier 106 coupled therebetween. These devices work in a substantially similar fashion as devices 110, 112 and 114 with the exception that band-pass filters 104 and 108 reject frequencies outside 2.40–2.4835 GHz.

After an RF signal has passed through one of the first front end receiver 132 and second front end receiver 134, the RF signal is coupled to an RF input of one of first mixer device 116 and second mixer device 118, respectively. First and second mixer devices 116 and 118 are conventional mixers with appropriate filtering. A local oscillator device 122, which may be part of a radio's synthesizer circuit, that is known in the art, is coupled to both the first and second mixer devices 116 and 118. The local oscillator device 122 produces a local oscillator signal (LO) and drives this signal to both a local oscillator input of first mixer device 116 and a local oscillator input of second mixer device 118. First and second mixer devices 116 and 118 are configured to mix the local oscillator signal with the respective RF signals input to one of the mixer devices 116 and 118, thereby producing one of a first and second intermediate frequency signals $IF_1$ and $IF_2$ respectively.

Signal $IF_1$ has a frequency substantially equal to a frequency difference between the $RF_1$ signal and the LO signal while signal $IF_2$ has a frequency substantially equal to a frequency difference between the $RF_2$ signal and the LO signal. The resulting first and second IF signals are then fed to IF filters 124 and 120 respectively where these signals are further filtered according to the particular receiver's design specification. Mixer devices and their operation are well known in the art.

One of the first and second signals IF and $IF_2$ may then be selectively coupled to back end circuitry 140 (shown in dotted line) by way of a second switching device 128. The back end circuitry may be utilized to amplify and demodulate one of the first and second IF signals. Second switching device 128 selectively couples, depending on a control signal generated by base band controller 127, one of the first and second IF signals to an IF amplifier 130 of back end circuitry 140. The resulting IF signal output by the IF amplifier 130 may be driven to a demodulator (not shown).

Local oscillator device 122 is configured to operate within a third frequency band which is positioned between the first and the second bands. The third band is substantially narrow (approximately 80 MHz). In this way, local oscillator device 122 operates as highside injection for the first band and as lowside injection for the second band. In one embodiment according to the present invention local oscillator device 122 may have its frequency band (third band) positioned substantially mid-way between the centers of the first and second frequency bands. This arrangement ensures that the output IF frequency bands of the first or second IF signals are substantially the same whether the IF signal is derived from the first or second bands. In this way, a single local oscillator IF unit and demodulator circuit can be used for signals belonging to both the first and second bands. Hence, the dual band radio receiver according to the present invention may be provided at a lower-cost since only one local oscillator and one back end circuitry need be included therein.

In the embodiment according to the present invention described herein, the first band is defined by a first frequency range of 1.910 GHz to 1.930 GHz, and the second band is defined by a second frequency range of 2.40 GHz to 2.4835 GHz. The local oscillator device 122 is configured to operate at frequencies within a third band, that are above the range of 1.910–1.930 GHz but below the range of 2.40–2.4835 GHz. The third frequency band, within which the local oscillator may operate, is positioned substantially half-way between the first and second bands. The frequencies which define the third band can be calculated in the following way. The difference between the lowest frequencies of the second and first band is equal to (2.40 GHz–1.910 GHz) which is equal to 490 MHz. A lower local oscillator frequency comprising the lower limit of the third band may be calculated according to the formula:

$$1.910 \text{ GHz} + \frac{490}{2} \text{ MHz} = 2.155 \text{ GHz}$$

An upper local oscillator frequency including the upper limit of the third band may be calculated according to the formula:

$$2.4835 \text{ GHz} - \frac{490}{2} \text{ MHz} = 2.2385 \text{ GHz}.$$

Accordingly, the local oscillator tuning range (third band) is approximately equal to the range 2.155–2.2385 GHz=83.5 MHz. Typically, the wider the band of a local oscillator, the longer the switching time. However, in the embodiment of the dual band radio receiver 100 according to the present invention, the narrow band of approximately 83.5 MHz, positioned substantially mid-way between the first and second bands, allows the local oscillator to quickly switch between the first and second bands. The small range of switching (tuning range) of the local oscillator affords quick switching from the first band to the second band thereby providing reception of intermittently transmitted voice and data signals with no loss of information.

Figure 2:
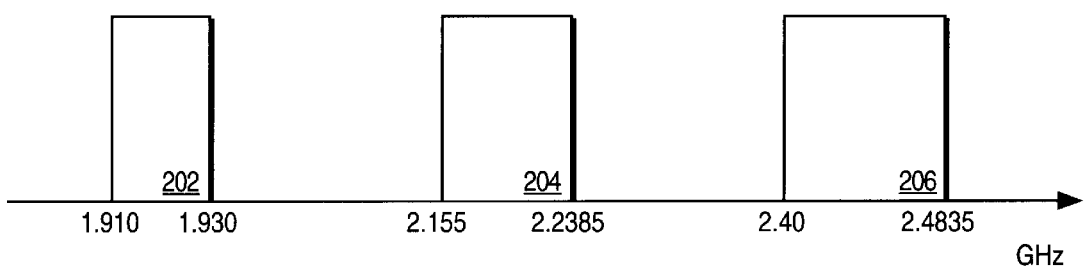
FIG. 2 illustrates a diagram showing the positions of the first, second, and third bands in connection with the dual-band communication device according to the present invention.

FIG. 2 illustrates a diagram showing the position of first, second and third frequency bands 202, 204 and 206 respectively, relative to one another in connection with the dual band communication device according to the present invention. First frequency band 202 is utilized for signals that have frequencies in the range 1.910–1930 GHz. Second frequency band 206 is utilized for signals that have frequencies in the range 2.40–2.4835 GHz. Third frequency band 204, positioned between the first and second frequency bands 202 and 206, includes frequencies in the range 2.155–2.2385.

Figure 3:
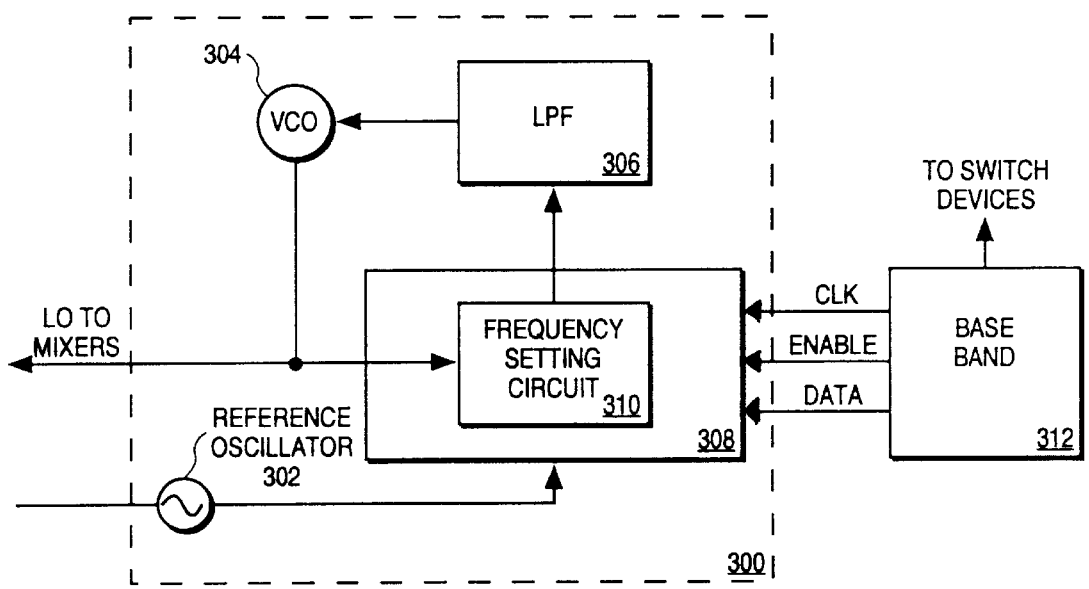
FIG. 3 illustrates a block diagram showing a local oscillator in connection with the dual-band radio receiver according to the present invention.

FIG. 3 illustrates a block diagram showing a local oscillator 300 of the dual band radio receiver according to the present invention. Local oscillator 300 includes a voltage control oscillator (VCO) 304 coupled to a synthesizer 308. The synthesizer 308 includes a frequency setting circuit 310 which sets the frequency of the local oscillator within the third band, which, in the embodiment described herein, is 2.155–2.2385 GHz. A signal output by synthesizer 308 is driven to a low pass filter 306 which processes this signal and further drives this signal to VCO 304. Based on the signal from low pass filter 306 VCO 304 generates a local oscillator signal to the mixer devices shown in FIG. 1. A base band controller 312 generates three signals to synthesizer 308: a clock signal (CLK), an enable signal (ENABLE), and a data (DATA) signal. A radio receiver according to the present invention may typically be included in a host circuit which communicates with a transmitter circuit that generates an RF signal, such that the host and the transmitter circuit operate in handshake with respect to transmission of signals therebetween. The base band 312 thus "knows" at a given moment what is the approximate frequency at which an RF signal is transmitted to the radio receiver and, if this frequency belongs to one of the first and second bands, base band controller 312 switches ON one of the first and second front ends via one of switching devices 126 and 128 respectively.

Figure 4:
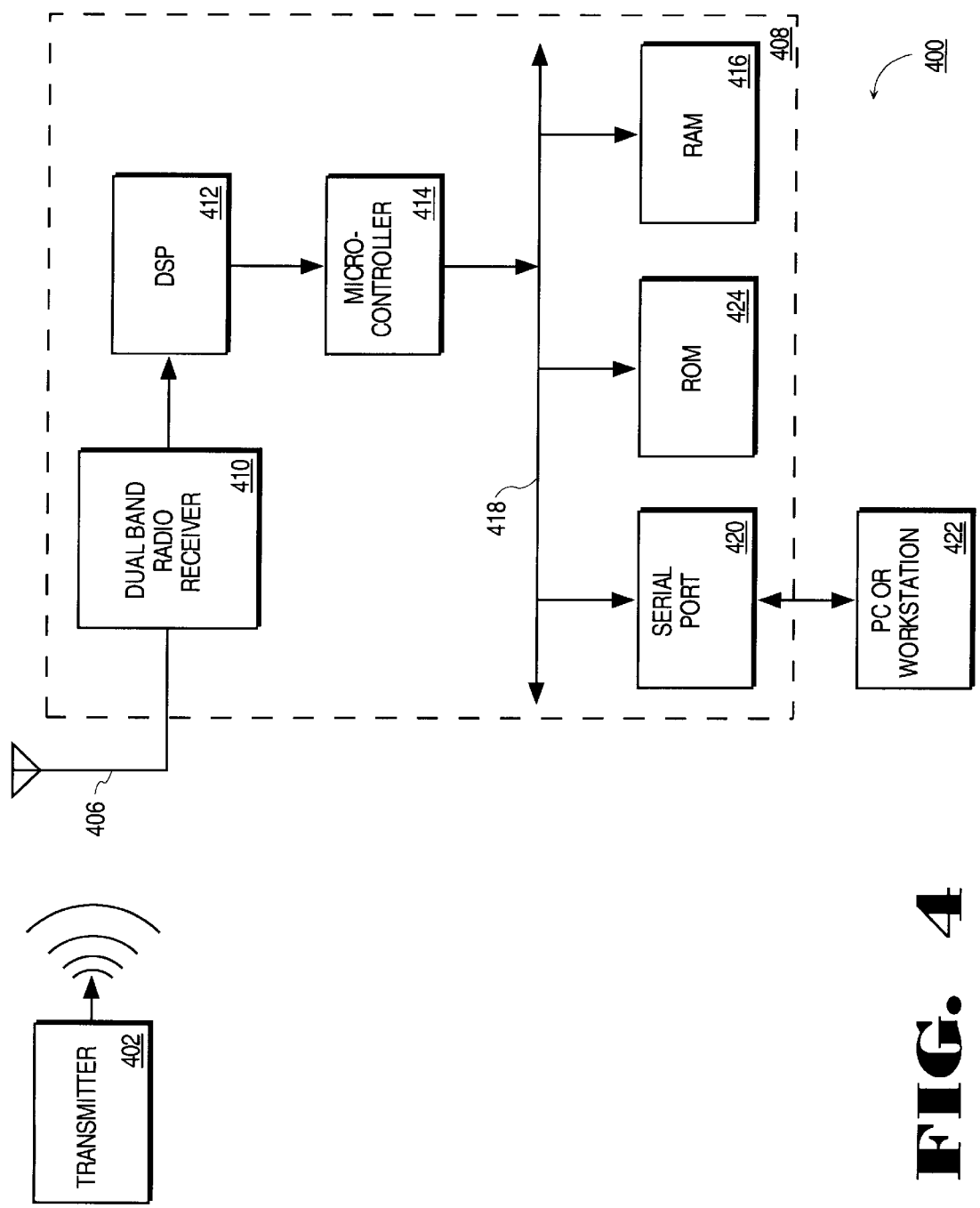
FIG. 4 illustrates a communication system including a dual-band radio receiver according to the present invention.

FIG. 4 illustrates a communication system 400 that includes a transmitter 402, that transmits RF signals to a communication device 408 via antenna 406. Communication device 408 includes dual-band radio receiver 410 that is coupled to a digital signal processing circuit (DSP) 412. After the RF signals have been down- converted and demodulated, digital signal processing circuit (DSP) 412 recovers signals and sends these signals by way of microcontroller 414 to a serial port 420, from where digital signals are sent to a PC or workstation 422. The communication device 410 may include a transceiver (not shown) and a transmittal circuit providing thus a way of transmitting information from the PC or workstation 422 to another radio receiver. When the communication device 408 is not directly coupled to a PC or workstation, DSP 412 and the microcontroller 414 also provide the necessary intelligence and most of the necessary modem functionality for transmitting data further via telephone or cellular networks. The communication device 408 provides a way to receive data and voice signals intermittently at high frequencies and process these signals very quickly by having a local oscillator like the one described in conjunction with FIG. 1 (not shown) switch from one band to another within a reduced time.

Figure 5:
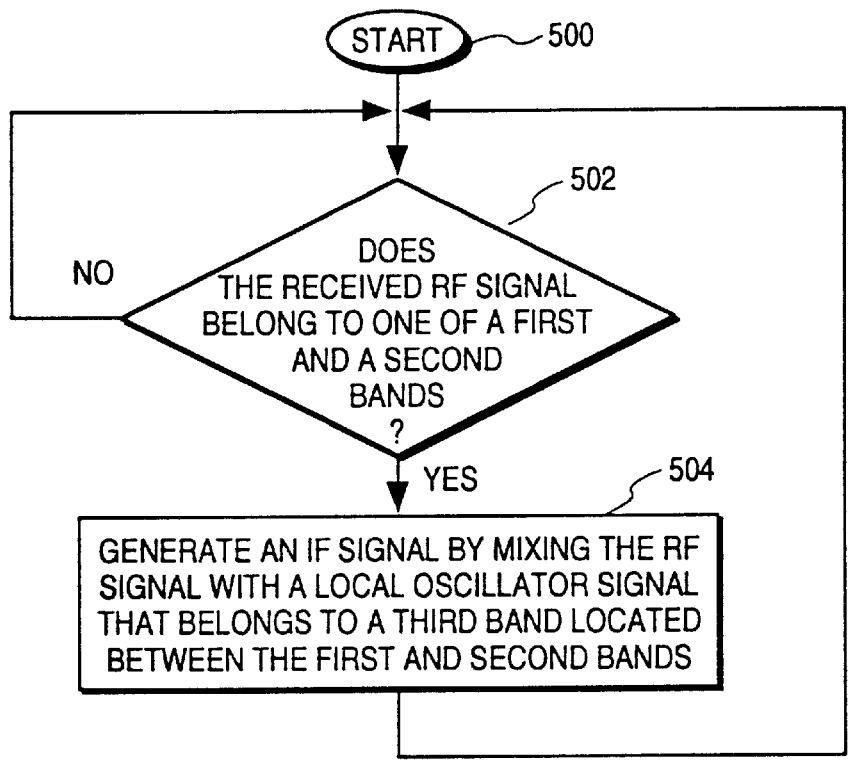
FIG. 5 illustrates a flow chart diagram in connection with a method for converting a RF signal into an IF signal in a dual band radio receiver according to the present invention.

FIG. 5 illustrates a flow chart diagram in connection with a process for converting a RF signal into an IF signal in a dual band radio receiver configured to receive radio frequency (RF) signals within first and second bands. The process starts as block 500 from where it passes to block 502 where it is determined whether the received RF signal belongs to one of a first and second bands. If the RF signal does not belong to one of the first and second bands the process flows to block 500. If the RF signal belongs to one of the first and second bands, the process passes to block 504 where an IF signal is generated by mixing the RF signal with a local oscillator signal belonging to a third frequency band. The third frequency band is located between the first and second bands. In one embodiment according to the process according to the present invention described in connection with FIG. 5, the third band is located approximately midway between said first and second bands. The process then flows back to block 500.

Figure 6:
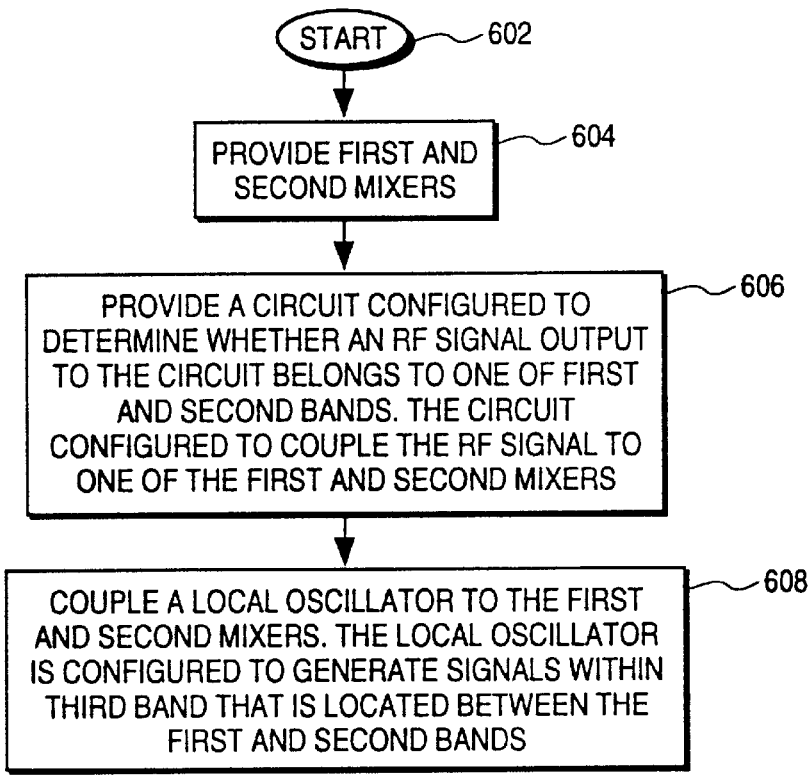
FIG. 6 illustrates a process for providing a dual band radio receiver according to the present invention.

FIG. 6 illustrates a process for providing a dual band radio receiver according to the present invention. The process starts at block 602 from where it passes to block 604 where first and second mixers are provided. The process then passes to block 606 where it is provided a circuit configured to determine whether an RF signal input to the circuit belongs to one of the first and second bands. The circuit is configured to couple the RF signal to one of the first and second mixers if it is determined that the RF signal belongs to one of the first and second bands. The process then flows to block 608 where a local oscillator is coupled to the first and second mixers. The local oscillator is configured to generate signals within a third band located between the first and second bands.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A dual band radio receiver comprising:
   a local oscillator configured to generate a Local Oscillator (LO) signal;
   a first two way switching device responsive to a base band controller for switching between a first Radio Frequency (RF) signal and a second RF signal, said first two way switching device coupled to a first front end receiver and a second front end receiver;
   a first mixer device configured to receive said LO signal and said first RF signal included within a first band and responsively to output a first Intermediate Frequency (IF) signal;
   a second mixer device configured to receive said LO signal and said second RF signal included within a second band and responsively to output a second IF signal;
   a second two way switching device responsive to said base band controller for switching between said first and second IF signals; and
   wherein said local oscillator is configured to operate within a third band located between said first and second bands and is responsive to said base band controller.

2. The dual band radio receiver of claim 1 further comprising first and second IF filters coupled between said first and second mixer devices and said second two way switching device, respectively.

3. The dual band radio receiver of claim 1 wherein said first band is within a frequency range of approximately 1.910 GHz and 1.930 GHz.

4. The dual band radio receiver of claim 1 wherein said second band is within a frequency range of approximately 2.40 and 2.4835 GHz.

5. The dual band radio receiver of claim 1 wherein said third band is between approximately 2.155 GHz and 2.2385 GHz.

6. The dual band radio receiver of claim 1 wherein said third band is positioned approximately half-way between said first and second bands.

7. A system comprising:
   a transmitter circuit; and
   a dual band radio receiver coupled to said transmitter, said dual band radio receiver including
      a local oscillator configured to generate an LO signal,
      a first two way switching device responsive to a base band controller for switching between a first Radio Frequency (RF) signal and a second RF signal, the first two way switching device coupled to a first front end receiver and a second front end receiver,
      a first mixer device configured to receive said LO signal and said first RF signal included within a first band and responsively to output a first IF signal,
      a second mixer device configured to receive said LO signal and said second RF signal included within a second band and responsively to output a second IF signal,
      a second two way switching device responsive to said base band controller for switching between said first and second IF signals, and
      wherein said local oscillator is configured to operate within a third band positioned between said first and second bands and responsive to said base band controller.

8. The system of claim 7 further comprising first and second IF filters coupled between said first and second mixer devices and said second two way switching device, respectively.

9. The system of claim 7 wherein said first band is within a frequency range of approximately 1.910 GHz and 1.930 GHz.

10. The system of claim 7 wherein said second band is within a frequency range of approximately 2.40 and 2.4835 GHz.

11. The system of claim 7 wherein said third band is between approximately 2.155 GHz and 2.2385 GHz.

12. The system of claim 7 wherein said third band is positioned approximately half-way between said first and second bands.

13. In a dual-band radio receiver configured to receive Radio Frequency (RF) signals within first and second bands, a method for converting an RF signal into an IF signal, the method comprising the steps of:
   a) determining whether said RF signal belongs to one of a first and a second bands; and
   b) if said RF signal belongs to one of said first and second bands, generating said IF signal in response to a base band controller by mixing said RF signal with a LO signal belonging to a third band located between said first and second bands.

14. The method of claim 13 wherein said step b) includes the step of:
   if said RF signal belongs to said first band, driving said RF signal and said LO signal to a first mixer device.

15. The method of claim 13 wherein said step b) includes the step of,
   if said RF signal belongs to said second band, driving said RF signal and said LO signal to a second mixer device.

16. The method of claim 13 wherein said third level is substantially half-way between said first and second bands.

17. The method of claim 13, wherein said first band is within a frequency range of approximately 1.910 and 1.930 GHz.

18. The method of claim 13 wherein said second band is within a frequency range of approximately 2.40 and 2.4835.

19. A method for providing a dual band radio receiver comprising:
   providing first and second front end receivers;
   providing first and second mixers wherein the first mixer is coupled to the first front end receiver and the second mixer is coupled to the second front end receiver;
   providing a base band controller;
   providing a circuit configured to determine whether an RF signal belongs to one of a first and second bands, said circuit coupling said RF signal to one of said first and second front end receivers if said circuit determines that the RF signal belongs to one of a first and second bands respectively and is responsive to said base band controller; and
   coupling a local oscillator to said first and second mixers, said local oscillator configured to generate signals within a third band that is positioned approximately mid-way between said first and second bands and wherein said local oscillator is responsive to said base band controller.

* * * * *